Dec. 13, 1927.

W. C. PERRY 1,652,542

LOCK JOINT FOR STANDING VALVES AND THE LIKE

Filed June 23, 1926

Inventor

Wightman C. Perry

By Lyon & Lyon

Attorneys

Patented Dec. 13, 1927.

1,652,542

UNITED STATES PATENT OFFICE.

WIGHTMAN C. PERRY, OF PLACENTIA, CALIFORNIA.

LOCK JOINT FOR STANDING VALVES AND THE LIKE.

Application filed June 23, 1926. Serial No. 117,947.

This invention relates to lock joints, and more especially to a type of lock joint suitable for connecting together the parts of standing valves and other valves used in deep well pumps.

An object of the invention is to prevent unscrewing of the parts that have a screw-threaded connection.

Another object is to make provision for release of the locking means when it is desired to disconnect the parts.

Further objects and advantages will appear in the subjoined detailed description.

The accompanying drawings illustrate the invention;

Figure 1:
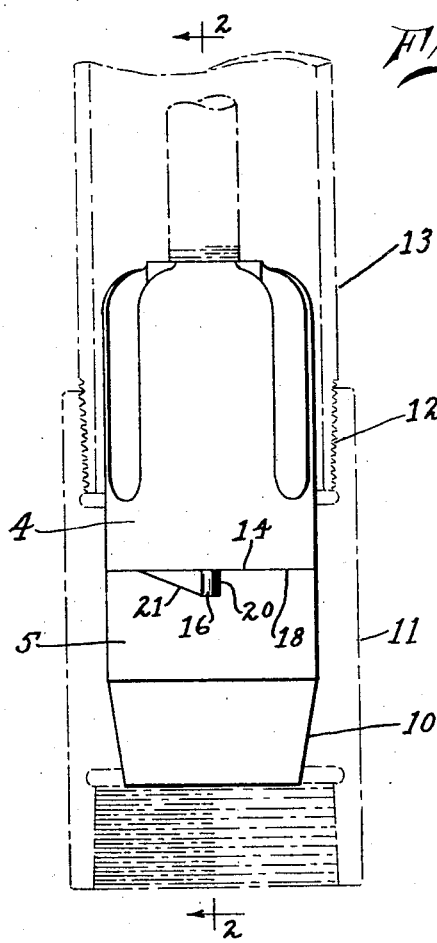
Figure 1 is a side elevation of a lock joint as embodied in a standing valve dotted lines indicating the standing valve seat and pump tubing.
Figure 2:
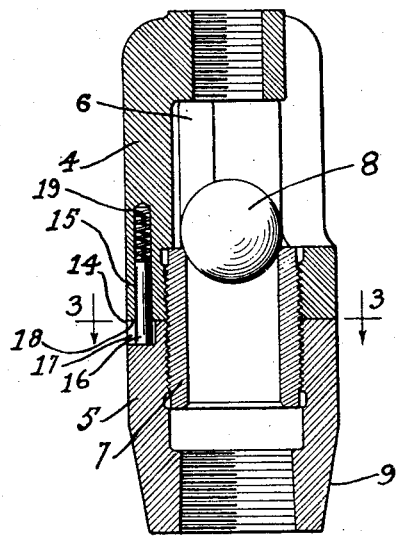
Figure 2 is a vertical sectional view on the line indicated by 2—2, Figure 1.
Figure 3:
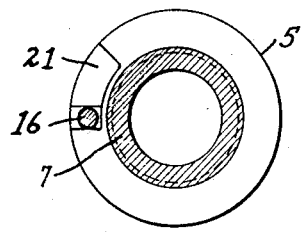
Figure 3 is a transverse section on the line indicated by 3—3, Figure 2.

The members that are to be locked together are indicated at 4, 5, and, in this instance, the member 4 is tubular and in the form of a valve cage of the open type, the outlet openings being indicated at 6; and the member 5 constitutes the tubular body of the valve. Both members 4, 5 are provided with internal screw-threads to engage an externally threaded valve seat 7.

In assembling the members 4, 5, the valve seat 7 will be screwed into either of said members and then the other of said members will be screwed onto the valve seat. A ball valve 8 closes upon the valve seat 7 and is adapted to rise from said seat to permit the passage of fluid through the valve body and cage.

The valve body 5 has an internally tapered portion 9 adapted to fit within the tapered portion 10 of a standing valve seat 11, which is screw-threaded at 12 onto the lower end of pump tubing 13. The standing valve seat 11 and pump tubing 13 are indicated in broken lines in Figure 1, as they constitute no portion of the present invention.

Extending longitudinally of the member 4 and opening to one end face 14 thereof is a cylindrical chamber 15 in which is slidably mounted a pin 16. The pin 16 is adapted to project from the member 4 into a recess 17 formed in the member 5 and opening to one end face 18 of said member 5. Preferably the recess 17 also opens to the periphery of the member 5, for a reason to appear hereinafter.

Though, in the drawings, the pin 16 is shown mounted in the upper member 4 with the recess 17 in the lower member 5, it is to be understood that these parts may be reversed and such reverse construction is obvious without further illustration. There is, however, an advantage in mounting the pin 16 in the upper member 4 as such construction will insure against dirt falling into the chamber 15 and interfering with the sliding of the pin 16. Gravity, alone, may be relied upon to tend to cause the pin 16 to enter the recess 17 when the members 4, 5 are relatively turned to position to register said pin with the recess 17 but, preferably, a coil spring 19 is mounted in the chamber 15 behind the pin 16 to urge said pin into the recess 17.

The side wall 20 of the recess 17 is vertical and, preferably, the other side wall 21 slopes away from the side wall 20 toward the member 4 so that when the members 4, 5 are relatively turned in a direction to screw them onto the valve seat 7, each time that the pin 16 drops into the recess 17, said pin will either ride up the sloping wall 21 or the wall 21 will ride under the lower end of the pin 16 so as to permit the members 4, 5 being turned until the adjacent end faces 14, 18 meet, so as to make a tight joint. In this instance, the screw threads are right hand and, accordingly, the vertical wall 20 is on the right of the pin 16 in Figure 1, and the sloping wall 21 is on the left of said pin. Thus, when the pin 16 is in the recess 17, the member 4 cannot turn to the right in Figure 1 relative to the member 5 and the member 5 cannot turn to the left relative to the member 4.

A lock joint of this type for preventing unscrewing of valve members in deep well pumping apparatus is of the utmost value because, the pump and standing valves, as ordinarily constructed, often separate at the joints when an attempt is being made to remove the valves from the wells, as is very frequently necessary in the pumping, for example, of coil. It will be readily understood that, after the standing valve has been inserted in its seat, in the construction indicated in the drawings, it is necessary to disengage the rod 22 from the valve cage by unscrewing the rod. This, of course, also tends to unscrew the cage from the valve seat, or the valve seat from the valve body. It will be readily understood that when separation of the valve cage and body occur in this manner, it necessitates a difficult fishing operation to remove the valve body. From this, it will be readily appreciated that much time and expense is saved by employing the locking device described above.

When it is desired to disconnect the members 4, 5, a thin bladed instrument may be inserted in the recess 17 beneath the pin 16 and pushed toward the member 4 to retract the pin from said recess and the members 4, 5 will then be relatively turned, thus causing the pin to ride upon the end face 18 of the member 5 until the pin again registers with the recess 17, whereupon the pin will again be retracted as before and these operations will be repeated until one or the other of the members 4, 5 is free from the member 7.

While the member 7, as shown, is preferably screw-threaded into both members 4, 5, it is to be understood that it may be integral with either one of them if the constructor so desires.

I claim:—

A standing valve comprising an externally screw threaded valve seat, a cage-forming member screwed onto said valve seat, a tubular member screwed onto the valve seat, one of said members provided with a recess in one end opening to the peripheral face thereof, a pin slidably mounted in the other member and releasably engaging in said recess, a spring yieldingly holding the pin engaged with the recess, and a valve in the cage engageable with the valve seat.

Signed at Los Angeles, Cal., this 16th day of June, 1926.

WIGHTMAN C. PERRY.